US007008724B2

(12) United States Patent
Cochran et al.

(10) Patent No.: US 7,008,724 B2
(45) Date of Patent: Mar. 7, 2006

(54) LITHIUM CELL WITH MIXED POLYMER SYSTEM

(75) Inventors: Steven D Cochran, Fishers, IN (US); Gregory K MacLean, Indianapolis, IN (US)

(73) Assignee: Enerdel, Inc., Fort Lauderdale, FL (US)

( * ) Notice: Subject to any disclaimer, the term of this patent is extended or adjusted under 35 U.S.C. 154(b) by 448 days.

(21) Appl. No.: 10/202,310

(22) Filed: Jul. 24, 2002

(65) Prior Publication Data

US 2004/0018428 A1 Jan. 29, 2004

(51) Int. Cl.
*H01M 4/02* (2006.01)
*H01M 4/60* (2006.01)

(52) U.S. Cl. ...................................... 429/209; 429/212

(58) Field of Classification Search ................ 429/209, 429/212

See application file for complete search history.

(56) References Cited

U.S. PATENT DOCUMENTS 5,922,493 A * 7/1999 Humphrey et al. ......... 429/316
6,183,912 B1 2/2001 Nazri
6,291,097 B1 9/2001 Barker et al.
6,406,815 B1 6/2002 Sandberg et al.
6,413,668 B1 7/2002 Sandberg et al.
6,419,712 B1 7/2002 Haverstick
6,456,042 B1 9/2002 Kwok
6,617,078 B1 9/2003 Chia et al.

* cited by examiner

*Primary Examiner*—Patrick Joseph Ryan
*Assistant Examiner*—Julian Mercado
(74) *Attorney, Agent, or Firm*—Akerman Senterfitt

(57) ABSTRACT

A lithium cell and method for producing, wherein an electrode contains a first polymer and a separator contains a second polymer having a melting point below that of the first polymer. The first polymer may be the same in the anode and the cathode, or one electrode may contain the first polymer and the other electrode contain a third polymer. The first polymer may be a homopolymer, and the second polymer may be a copolymer, and may contain the first and/or third polymers as components. In one embodiment, the first polymer is polyvinylidene fluoride (PVDF) and the second polymer is PVDF and hexafluoropropylene. The relatively high melting point first and/or first and third polymer(s) permits high temperature drying of the electrodes, which facilitates water removal and thereby increases cell life. It also reduces swelling of the porous structure, which facilitates permeation of the electrolyte.

12 Claims, No Drawings

LITHIUM CELL WITH MIXED POLYMER SYSTEM

FIELD OF THE INVENTION

This invention relates to a method of preparation of lithium cells, in particular lithium ion and lithium ion polymer batteries.

BACKGROUND OF THE INVENTION

Lithium ion cells and batteries are secondary (i.e., rechargeable) energy storage devices well known in the art. The lithium ion cell, known also as a rocking chair type lithium ion battery, typically comprises essentially a carbonaceous anode (negative electrode) that is capable of intercalating lithium ions, a lithium-retentive cathode (positive electrode) that is also capable of intercalating lithium ions, and a non-aqueous, lithium ion conducting electrolyte therebetween.

The carbon anode comprises any of the various types of carbon (e.g., graphite, coke, carbon fiber, etc.) which are capable of reversibly storing lithium species, and which are bonded to an electrochemically conductive current collector (e.g. copper foil or grid) by means of a suitable organic binder (e.g., polyvinylidene fluoride, PVdF).

The cathode comprises such materials as transition metal chalcogenides that are bonded to an electrochemically conductive current collector (e.g., aluminum foil or grid) by a suitable organic binder. Chalcogenide compounds include oxides, sulfides, selenides, and tellurides of such metals as vanadium, titanium, chromium, copper, molybdenum, niobium, iron, nickel, cobalt and manganese. Lithiated transition metal oxides are at present the preferred positive electrode intercalation compounds. Examples of suitable cathode materials include $LiMnO_2$, $LiCoO_2$, $LiNiO_2$, and $LiFePO_4$, their solid solutions and/or their combination with other metal oxides and dopant elements, e.g., titanium, magnesium, aluminum, boron, etc.

The electrolyte in such lithium ion cells comprises a lithium salt dissolved in a non-aqueous solvent which may be (1) completely liquid, (2) an immobilized liquid (e.g., gelled or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, polyvinylidene fluoride, polyolefins such as polypropylene and polyethylene, and polycarbonates, and may be polymerized in situ in the presence of the electrolyte to trap the electrolyte therein as the polymerization occurs. Known polymers for pure polymer electrolyte systems include polyethylene oxide (PEO), polymethylene-polyethylene oxide (MPEO), or polyphosphazenes (PPE). Known lithium salts for this purpose include, for example, $LiPF_6$, $LiClO_4$, LiSCN, $LiAlCl_4$, $LiBF_4$, $LiN(CF_3SO_2)_2$, $LiCF_3SO_3$ , $LiC(SO_2CF_3)_3$, $LiO_3SCF_2CF_3$, $LiC_6F_5SO_3$, $LiO_2CF_3$, $LiAsF_6$, and $LiSbF_6$. Known organic solvents for the lithium salts include, for example, alkylcarbonates (e.g., propylene carbonate, ethylene carbonate), dialkyl carbonates, cyclic ethers, cyclic esters, glymes, lactones, formates, esters, sulfones, nitrites, and oxazolidinones. The electrolyte is incorporated into pores in a separator layer between the cathode and anode. The separator may be glass mat, for example, containing a small percentage of a polymeric material, or may be any other suitable ceramic or ceramic/polymer material. Silica is a typical main component of the separator layer.

Lithium-ion cells made from pure polymer electrolytes, or liquid electrolytes entrapped in a polymer matrix, are known in the art as "lithium-ion polymer" cells, and the electrolytes therefore are known as polymeric electrolytes. Lithium-polymer cells are often made by adhering, e.g. by laminating, thin films of the anode, cathode and electrolyte together wherein the electrolyte/separator layer is sandwiched between the anode and cathode layers to form an individual cell, and a plurality of such cells are bundled together to form a higher energy/voltage battery.

In lithium ion polymer cells, the same polymer is used to adhere the current collector to the electrodes, and to adhere the separator to the electrodes. Use of a copolymer beneficially yields good adhesion of the electrodes to the separator, which is required for optimum ion transfer and cell performance, but reduces any possibility of high-temperature drying of the electrodes, which beneficially removes water. This is because the copolymer has a lower melting point relative to a homopolymer, and thus cannot withstand high-temperature drying as would a homopolymer. Use of a homopolymer beneficially allows for high temperature drying of the electrodes and less swelling within the electrode and separator, desirably retaining the porous structure and thereby allowing electrolyte flow within the entire electrode, but yields reduced adhesion of the electrodes to the separator.

There is thus a need to develop methods to assemble and produce a lithium cell with polymers that allow high-temperature drying of the electrodes, and with less swelling of the polymer and less resulting loss of electrical conductivity in the electrode, and that also yield good adhesion of the electrodes to the separator.

SUMMARY OF THE INVENTION

The present invention provides a lithium cell, in particular a lithium ion or lithium ion polymer battery, containing a mixed polymer system. In one embodiment, the cell contains a first electrode, a second electrode, and a separator between the first and second electrodes, a first polymer in at least one of the first and second electrodes and, in and/or on the separator, a second polymer that is different from the first polymer and that has a melting point lower than a melting point of the first polymer. If the first polymer is not in both the first and second electrodes, the electrode not containing the first polymer contains a third polymer.

In another embodiment, the cell contains a homopolymer in the electrodes, and a copolymer in and/or on the separator. In this embodiment, the homopolymer may be polyvinylidene fluoride (PVdF) and the copolymer may be PVdF-hexafluoropropylene (HFP), but other homopolymers and copolymers are included within the scope of the invention where the homopolymer has a higher melting or softening point relative to the copolymer.

The polymers in the electrodes, which may be the same or may be different, effects good adhesion of the electrodes to the separator which, in turn, facilitates optimum binding of the layers for ion transfer. The polymers in the electrodes also allows the electrodes to be dried at elevated temperatures, which beneficially removes water from the cell, such as water that is entrained in the cathode active material and/or anode active material.

The present invention also provides a method of producing a lithium cell containing a mixed polymer system. An electrode containing a first polymer therein, and a separator containing a second polymer having a melting or softening point below that of the first polymer, is provided. In one embodiment, the first polymer is PVdF and the second polymer is a copolymer of PVdF-HFP.

The present invention also provides a method for adhering a film on an electrode having a current collector in a lithium cell by providing a first polymer in at least one of the electrodes. In one embodiment, the first polymer is PVdF. The method also reduces swelling in the electrodes, thus retaining a porous structure permitting flow of electrolyte throughout the entire electrode.

The present invention also provides a method for adhering a separator and electrodes in a lithium ion polymer battery by providing a second polymer having a melting or softening point below that of a first polymer, in and/or on the separator and a first polymer in at least one of the electrodes. In one embodiment, the first polymer is PVdF and the second polymer is a copolymer of PVdF-HFP.

DETAILED DESCRIPTION

The present invention provides a lithium cell, more particularly a lithium ion polymer battery, containing a mixed polymer system. The cell contains a first polymer, which may be a homopolymer, as an adhesive in at least one of the electrodes, and a second polymer that has a melting or softening point below that of the first polymer, and which may be a copolymer, as an adhesive in and/or on the separator. In an exemplary embodiment, a first polymer is present in one electrode, and either the same first polymer or a different third polymer is present in the other electrode. A second polymer may be one polymer that has a melting point lower than that of the first polymer, or may be a copolymer or a mixed polymer which is produced by blending or co-polymerization of two or more substances (e.g., copolymers, terpolymers, etc.) at the same time. The copolymer may or may not include, as one of its component polymers, the first polymer and/or the third polymer. The first and second electrodes may further contain a plasticizer along with the polymer. For examples, plasticizers may be propylene carbonate, phthalic acid diesters, adipic acid diesters, acetic acid esters, organic phosphates, trimellitic acid triesters, and combinations thereof.

In one embodiment, the first polymer in the anode and cathode is polyvinylidene fluoride (PVdF), and the second polymer in and/or on the separator layer is a PVDF-hexafluoropropylene (HFP) copolymer. However, other embodiments are also included within the scope of the invention. For example, the first polymer in the anode need not be the polymer in the cathode. The separator layer may contain a second polymer which is a copolymer of the homopolymer in the anode and/or cathode and at least one additional polymer, or it may contain one or more different polymers, or it may contain a homopolymer used in the anode but not used in the cathode and at least one additional polymer, or it may contain a polymer used in the cathode but not used in the anode and at least one additional polymer. Thus any combination may be used in which the melting or softening point of the second polymer in and/or on the separator is below the melting or softening point(s) of the first and/or first and third polymer(s) in the electrodes. As used herein, the term melting point also encompasses the softening point for polymers which soften, rather than melt, upon heating. In one embodiment, the temperature difference between the first and/or first and third polymer(s) and second polymer is at least 2° C.

Examples of materials that may be used as either first polymers and/or first and third polymers, or as a component of a copolymer of a second polymer include, but are not limited to, polymers, copolymers, and mixtures of PVdF, polyvinylidene chloride fluoride, polyvinylidene chloride, polyvinyl chloride, polyvinylchloride acetates, polyacrylonitriles, polyfluoroethylenes and propylenes, polyolefins such as polyethylene and polypropylene, acrylic or maleic acid modified polyethylene or polypropylene, polyvinyl alcohols, polyglycols, polyacetates, polyesters, polyacrylates, polycarbonates, polyethylene oxides and polypropylene oxides, polyacrylic acid esters, cellulose acetate and butyrate, nylons, polyurethanes, polyterephthalates, and polystyrenes. These materials may be obtained from commercial sources, as known to one skilled in the art.

The first polymer in at least one of the electrodes, and advantageously in each electrode as either the same polymer or a third polymer, provides good adhesion of the current collector to the electrode, and its low swelling retains a porous structure for ion transfer. The first polymer, and/or first and third polymers, has or have a high melting point relative to the second polymer. This difference in melting point permits the first and/or first and third polymer(s) to withstand the elevated temperatures needed to dry the electrodes without decomposition. Because water is a major impurity which contributes to increased cell impedance, it is desirable to remove as much water as possible to enhance cell performance and cell capacity. However, water may be superficially included in the cell components, as well as relatively tightly entrained in or bound to the active material, for example, a cathode active material such as $LiMnO_2$, $LiCoO_2$, $LiNiO_2$, and $LiFePO_4$, their solid solutions and/or their combination with other metal oxides and dopant elements, e.g., titanium, magnesium, aluminum, boron, etc. An anode active material, such as natural and synthetic carbons, tin oxides, titanium oxides, their solid solutions and/or their combination with other metal oxides and dopant elements. Drying the electrodes at elevated temperatures is needed to remove entrained water, but elevated temperatures may also decompose elements of the cell. Advantageously, the first and/or first and third polymer(s) is/are stable to decomposition at elevated temperatures.

The second polymer in and/or on the separator has a lower melting or softening point relative to the first polymer or the first and third polymers. In one embodiment, the difference in melting or softening points is at least 2° C. If the second polymer is a copolymer that includes the first polymer and/or third polymer used in one or both of the electrodes as one of its components, the other polymer or polymers in the copolymer have a melting or softening point below that of the first polymer and below that of the third polymer. The second polymer is compatible with the first polymer and third polymer in that it bonds sufficiently with them to form a cell.

The second polymer may be applied to the separator as a coating using methods known to one skilled in the art, and may be part of the coating material. The coating may include fumed silica, or may contain the second polymer alone. The second polymer may be coated on another polymer Any coating process known to one skilled in the art may be used, such as spray coating, dip coating, direct application, indirect application, etc. The second polymer may be incorporated within the separator, for example, by solution casting, or may be sprayed directly onto the polymer surfaces of the electrodes.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A battery cell, comprising:

a first electrode layer having a composition comprising a first polymer;

a second electrode layer, having a composition comprising a third polymer, wherein said first polymer and said third polymer are different;

a separator layer having a composition comprising a second polymer that has a melting point below tax of the first polymer and below that of the third polymer, the separator layer between the first and second electrode layers and having a first electrode-contacting surface and a second electrode-contacting surface; and a first current collector layer adjacent the first electrode layer at a surface opposite its separator-contacting surface, and a second current collector layer adjacent the second electrode layer at a surface opposite its separator-contacting surface; wherein the first and second electrode layers are each adhered to the separator layer at their respective first and second electrode-contacting surfaces, and the first and second current collector layers are each adhered to their respective first and second electrodes at the surfaces opposite their respective separator-contacting surfaces.

2. The battery cell of claim 1, wherein the first current collector layer comprises copper and the first electrode layer is an anode.

3. The battery cell of claim 1, wherein the second current collector layer comprises aluminum and the second electrode layer is a cathode.

4. A battery cell, comprising:

a first electrode layer having a composition comprising a first polymer;

a second electrode layer having a composition comprising a third polymer, wherein said first polymer and said third polymer are different; and a separator layer having a composition comprising a second polymer that has a melting point below that of the first polymer and below that of the third polymer, wherein said separator is disposed between said first electrode and said second electrode.

5. The battery cell of claim 4, wherein said separator layer has a first electrode-contacting surface and a second electrode-contacting surface.

6. A lithium cell, comprising:

a first electrode layer and a second electrode layer, at least one of said first electrode and said second electrode having a composition comprising a first polymer;

a separator layer disposed between said first and second electrodes, wherein said separator layer has a composition comprising a third polymer; and a coating layer having a composition comprising a second polymer, said coating layer being disposed on at least one of said first electrode, said separator, and said second electrode, wherein said second polymer has a melting point below that of said first polymer, said coating layer having a composition different from said separator layer.

7. The cell of claim 6, wherein said coating is disposed between both said first electrode and said separator, and said second electrode and said separator.

8. The cell of claim 6, wherein said first electrode has a composition comprising said first polymer and said second electrode has a composition comprising a fourth polymer, said second polymer having a melting point below that of said fourth polymer.

9. The cell of claim 8, wherein said fourth polymer and said first polymer are different polymer compositions.

10. The cell of claim 6, wherein said second polymer and said third polymer arc different polymer compositions.

11. The cell of claim 6, wherein said coating layer is in physical contact with at least one of said first electrode, said separator, and said second electrode.

12. The cell of claim 6, wherein said coating layer is in physical contact with said separator.

* * * * *